(12) United States Patent
Watanabe et al.

(10) Patent No.: US 11,118,662 B2
(45) Date of Patent: Sep. 14, 2021

(54) LOCK-UP DEVICE

(71) Applicant: EXEDY Corporation, Neyagawa (JP)

(72) Inventors: Tohru Watanabe, Neyagawa (JP); Mitsuhiro Sasaki, Neyagawa (JP)

(73) Assignee: EXEDY CORPORATION, Neyagawa (JP)

(*) Notice: Subject to any disclaimer, the term of this patent is extended or adjusted under 35 U.S.C. 154(b) by 82 days.

(21) Appl. No.: 16/710,441

(22) Filed: Dec. 11, 2019

(65) Prior Publication Data
US 2020/0271207 A1 Aug. 27, 2020

(30) Foreign Application Priority Data
Feb. 22, 2019 (JP) .............................. JP2019-030266

(51) Int. Cl.
| | |
|---|---|
| *F16H 45/02* | (2006.01) |
| *F16D 25/0638* | (2006.01) |
| *F16D 127/02* | (2012.01) |
| *F16D 129/04* | (2012.01) |
| *F16D 121/04* | (2012.01) |

(52) U.S. Cl.
CPC ......... *F16H 45/02* (2013.01); *F16D 25/0638* (2013.01); *F16D 2121/04* (2013.01); *F16D 2127/02* (2013.01); *F16D 2129/04* (2013.01); *F16H 2045/0221* (2013.01); *F16H 2045/0284* (2013.01)

(58) Field of Classification Search
CPC .. F16D 45/02; F16D 2121/04; F16D 25/0638; F16D 2127/02; F16D 2045/0221
See application file for complete search history.

(56) References Cited

U.S. PATENT DOCUMENTS

| | | | | |
|---|---|---|---|---|
| 5,579,883 A | * | 12/1996 | Tsukamoto | ......... F16D 25/0638 192/48.611 |
| 6,386,067 B1 | * | 5/2002 | Inoue | ...................... F16H 45/02 74/730.1 |
| 2003/0173175 A1 | * | 9/2003 | Tomiyama | .............. F16H 45/02 192/3.29 |
| 2010/0179026 A1 | * | 7/2010 | Grochowski | ....... F16D 25/0638 477/180 |

(Continued)

FOREIGN PATENT DOCUMENTS

JP 2013-217452 A 10/2013

*Primary Examiner* — Stacey A Fluhart
(74) *Attorney, Agent, or Firm* — United IP Counselors, LLC (57) ABSTRACT

A lock-up device for a torque converter transmitting a torque from a front cover to a transmission-side member is disclosed. The lock-up device includes a clutch part, a piston, and a return mechanism. The piston is axially opposed to the front cover through the clutch part. The piston is axially movable and applies a pressing force to the clutch part whereby the clutch part is turned to an activated state. The return mechanism urges the piston away from the front cover. The return mechanism is disposed axially between the front cover and the piston while disposed radially inside the clutch part. The return mechanism includes first and second plates, and an elastic member. The first plate contacts the front cover. The second plate contacts the piston while axially opposed to the first plate. The elastic member is disposed between the first and second plates in a compressed state.

8 Claims, 5 Drawing Sheets

(56) References Cited

U.S. PATENT DOCUMENTS

| | | | |
|---|---|---|---|
| 2014/0332336 A1* | 11/2014 | Akahane | F16H 57/027 |
| | | | 192/70.11 |
| 2015/0008086 A1* | 1/2015 | Mototsune | F16D 33/18 |
| | | | 192/3.29 |
| 2017/0276242 A1* | 9/2017 | Matsubara | F16D 48/06 |
| 2018/0163794 A1* | 6/2018 | Deneszczuk | F16D 25/12 |
| 2018/0245643 A1* | 8/2018 | Caumartin | F16D 21/06 |
| 2018/0313411 A1* | 11/2018 | Satoyoshi | B60L 15/2054 |

\* cited by examiner

LOCK-UP DEVICE

CROSS-REFERENCE TO RELATED APPLICATIONS

This application claims priority to Japanese Patent Application No. 2019-030266, filed Feb. 22, 2019. The contents of that application are incorporated by reference herein in their entirety.

TECHNICAL FIELD

The present invention relates to a lock-up device, particularly to a lock-up device for a torque converter for transmitting a torque from a front cover to a transmission-side member through a turbine.

BACKGROUND ART

Torque converters are often equipped with a lock-up device for directly transmitting a torque from a front cover to a turbine. Such a lock-up device includes a piston, an input-side plate, a plurality of torsion springs and an output-side plate. The piston is capable of being coupled by friction to the front cover. The input-side plate is fixed to the piston. The torsion springs are supported by the input-side plate. The output-side plate is elastically coupled through the torsion springs to the piston and the input-side plate in a rotational direction. The output-side plate is fixed to the turbine.

Additionally, as described in Japan Laid-open Patent Application Publication No. 2013-217452, there has been also proposed a type of lock-up device that a hydraulic chamber for lock-up purpose is formed between the front cover and the turbine and is supplied with hydraulic oil so as to move the piston from a turbine side to a front cover side. The lock-up device described in Japan Laid-open Patent Application Publication No. 2013-217452 is provided with a disc spring between the front cover and the piston as a return spring configured to separate the piston from a clutch plate such that a lock-up off state is made.

The lock-up device described in Japan Laid-open Patent Application Publication No. 2013-217452 is configured to separate the piston from the clutch plate by causing the disc spring to make direct contact with the front cover and the piston. When the disc spring is used as the return spring, the lock-up device can be reduced in axial dimension. However, it is difficult to dispose such a type of disc spring as having an appropriate elastic force (return characteristic) in a space between the front cover and the piston, albeit depending on the size of the space. On the other hand, even when a coil spring is used as the return spring, it is also difficult to obtain an appropriate elastic force.

BRIEF SUMMARY

It is an object of the present invention to obtain an appropriate return characteristic for separating a piston from a clutch plate in a lock-up device with a simple mechanism.

(1) A lock-up device according to the present invention is provided in a torque converter for transmitting a torque from a front cover to a transmission-side member through a turbine. The lock-up device includes a clutch part, a piston and a return mechanism. The clutch part transmits the torque from the front cover toward the turbine. The piston is disposed in axial opposition to the front cover through the clutch part, and is axially movable. Additionally, the piston applies a pressing force to the clutch part whereby the clutch part is turned to a power transmission activated state. The return mechanism urges the piston in a direction separating from the front cover, and is disposed axially between the front cover and the piston while being disposed radially inside the clutch part. The return mechanism includes a first plate, a second plate and an elastic member. The first plate makes contact with the front cover. The second plate makes contact with the piston, while being disposed in axial opposition to the first plate. The elastic member is disposed between the first plate and the second plate, while being set in a compressed state.

In the present lock-up device, the piston applies the pressing force to the clutch part, whereby a lock-up on state (power transmission activated state) is made. Additionally, the piston is urged in the direction separating from the front cover by the return mechanism. The piston is separated from the front cover by this urging force when an actuation force (e.g., hydraulic pressure) does not act on the piston. In other words, a lock-up off state (power transmission deactivated state) is made.

Here, the return mechanism is composed of the first plate, the second plate and the elastic member, and these members can be integrated as a sub-unit. Therefore, it is made easy to use an elastic member having an appropriate elastic force (urging force) by variously changing the shapes of the first and second plates. As a result, an appropriate return characteristic can be easily realized.

Moreover, the first plate only makes contact with the front cover while the second plate only makes contact with the piston. This structure is thus simple, and enables assembling these plates in place with good workability.

(2) Preferably, each of the first and second plates has a disc shape. Besides preferably, at least either of the first and second plates makes contact at an outer peripheral surface thereof with the clutch part whereby the return mechanism is radially positioned.

In this case, either of the first and second plates makes contact at the outer peripheral surface thereof with the clutch part, whereby the return mechanism can be radially positioned. Therefore, any special element for positioning is not required, whereby the entire device configuration can be made simple.

(3) Preferably, the first plate makes contact with a lateral surface of the front cover without fixed thereto. Besides preferably, the second plate makes contact with a lateral surface of the piston without fixed thereto.

In this case, any configuration for fixing the first and second plates is not required, whereby the entire device configuration can be made simpler.

(4) Preferably, the clutch part includes a first member, a second member, a first clutch plate and a second clutch plate. The first member is fixed to the front cover, and includes a first tubular portion protruding toward the piston. The second member, which is a member for transmitting the torque toward the turbine, includes a second tubular portion disposed in radial opposition to the first tubular portion. The first clutch plate is engaged with the first tubular portion. The second clutch plate is engaged with the second tubular portion. Additionally, the at least either of the first and second plates is capable of making contact at the outer peripheral surface thereof with an inner peripheral surface of the first tubular portion.

(5) Preferably, the lock-up device further includes a boss that is fixed to an inner peripheral part of the front cover and protrudes axially toward the turbine. Besides preferably, each of the first and second plates is made in shape of a disc including a hole in a center part thereof, and the first plate makes contact at an inner peripheral surface thereof with an outer peripheral surface of the boss whereby the return mechanism is radially positioned.

(6) Preferably, the first plate is interposed at an inner peripheral end thereof between a lateral surface of the front cover and a lateral surface of the boss whereby the return mechanism is axially positioned.

(7) Preferably, the elastic member is one of a plurality of coil springs disposed in circumferential alignment between an outer peripheral part of the first plate and an outer peripheral part of the second plate.

(8) Preferably, the first plate includes a first edge annularly protruding toward the second plate, and the second plate includes a second edge that annularly protrudes toward the first plate and is disposed in opposition to the first edge. Besides preferably, the first edge is press-fitted to an inner periphery of one end of the coil spring while the second edge is press-fitted to an inner periphery of the other end of the coil spring, whereby the coil spring is supported by the first and second plates.

In this case, the first plate, the second plate and the coil spring, which are integrated as the sub-unit, can be temporarily fixed, and can be thereby enhanced in transportability and workability in assemblage.

(9) Preferably, the lock-up device further includes a damper part that is disposed between the clutch part and the turbine and includes an elastic member for attenuating torque fluctuations.

Overall, according to the present invention described above, it is possible to easily realize an appropriate return characteristic for separating a piston from a clutch plate in a lock-up device with a simple mechanism.

DETAILED DESCRIPTION

Figure 1:
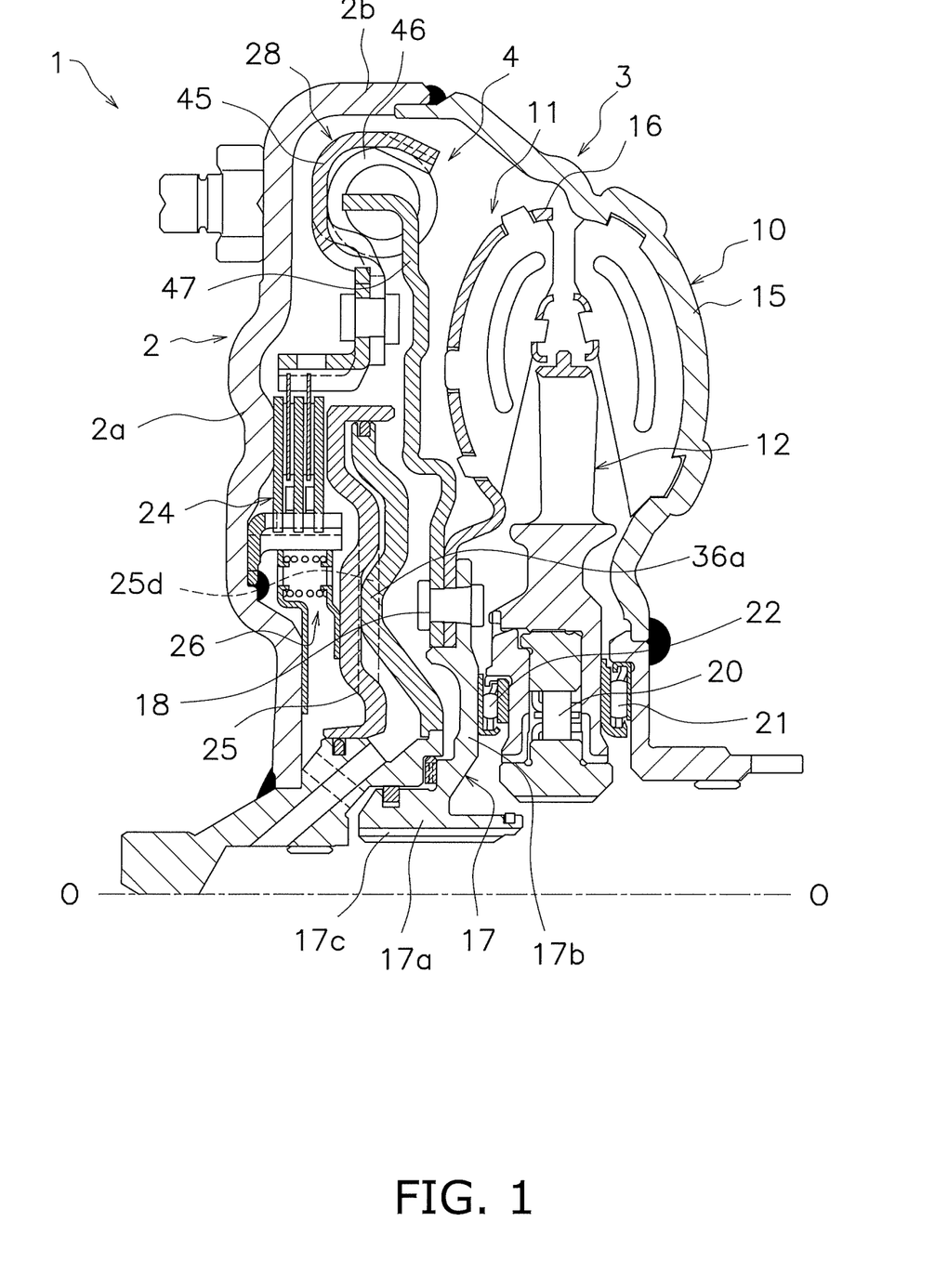
FIG. 1 is a cross-sectional view of a torque converter including a lock-up device according to a preferred embodiment of the present invention.

FIG. 1 is a partial cross-sectional view of a torque converter 1 including a lock-up device according to a preferred embodiment of the present invention. In FIG. 1, an engine (not shown in the drawing) is disposed on the left side whereas a transmission (not shown in the drawing) is disposed on the right side. It should be noted that line O-O depicted in FIG. 1 indicates a common rotational axis for the torque converter 1 and the lock-up device. It should be also noted that in the following explanation, the term "radial direction" refers to a direction separating from the rotational axis whereas the term "axial direction" refers to a direction arranged along the rotational axis.

[Entire Configuration of Torque Converter 1]

The torque converter 1 is a device that transmits a torque from an engine-side crankshaft (not shown in the drawings) to an input shaft of the transmission. As shown in FIG. 1, the torque converter 1 includes a front cover 2, a torque converter body 3 and a lock-up device 4.

The front cover 2 is fixed to an input-side member. The front cover 2 is a member having a substantially disc shape, and includes a disc portion 2a and an outer peripheral tubular portion 2b provided on the outer peripheral part of the disc portion 2a so as to protrude toward the transmission.

[Torque Converter Body 3]

The torque converter body 3 includes an impeller 10, a turbine 11 and a stator 12. The impeller 10 includes an impeller shell 15 fixed to the outer peripheral tubular portion 2b of the front cover 2 by welding. The turbine 11 is disposed in opposition to the impeller 10 within a fluid chamber. The turbine 11 includes a turbine shell 16 forming an enclosure. The turbine shell 16 is provided with a turbine hub 17 in the inner peripheral part thereof. The turbine hub 17 includes a hub 17a, provided in the center part thereof, and a flange 17b extending radially outward from the outer periphery of the hub 17a. The flange 17b is fixed to the inner peripheral part of the turbine shell 16 by at least one rivet 18. Additionally, the hub 17a is provided with a spline hole 17c in the inner peripheral part thereof such that the input shaft of the transmission (not shown in the drawings) is engaged therewith. The stator 12 is disposed between the inner peripheral part of the impeller 10 and that of the turbine 11, and regulates the flow of hydraulic oil returning from the turbine 11 to the impeller 10. The stator 12 is supported by a stationary shaft through a one-way clutch 20. It should be noted that a thrust bearing 21 is disposed between the stator 12 and the impeller 10, while a thrust bearing 22 is disposed between the stator 12 and the turbine hub 17.

[Lock-up Device 4]

Figure 2:
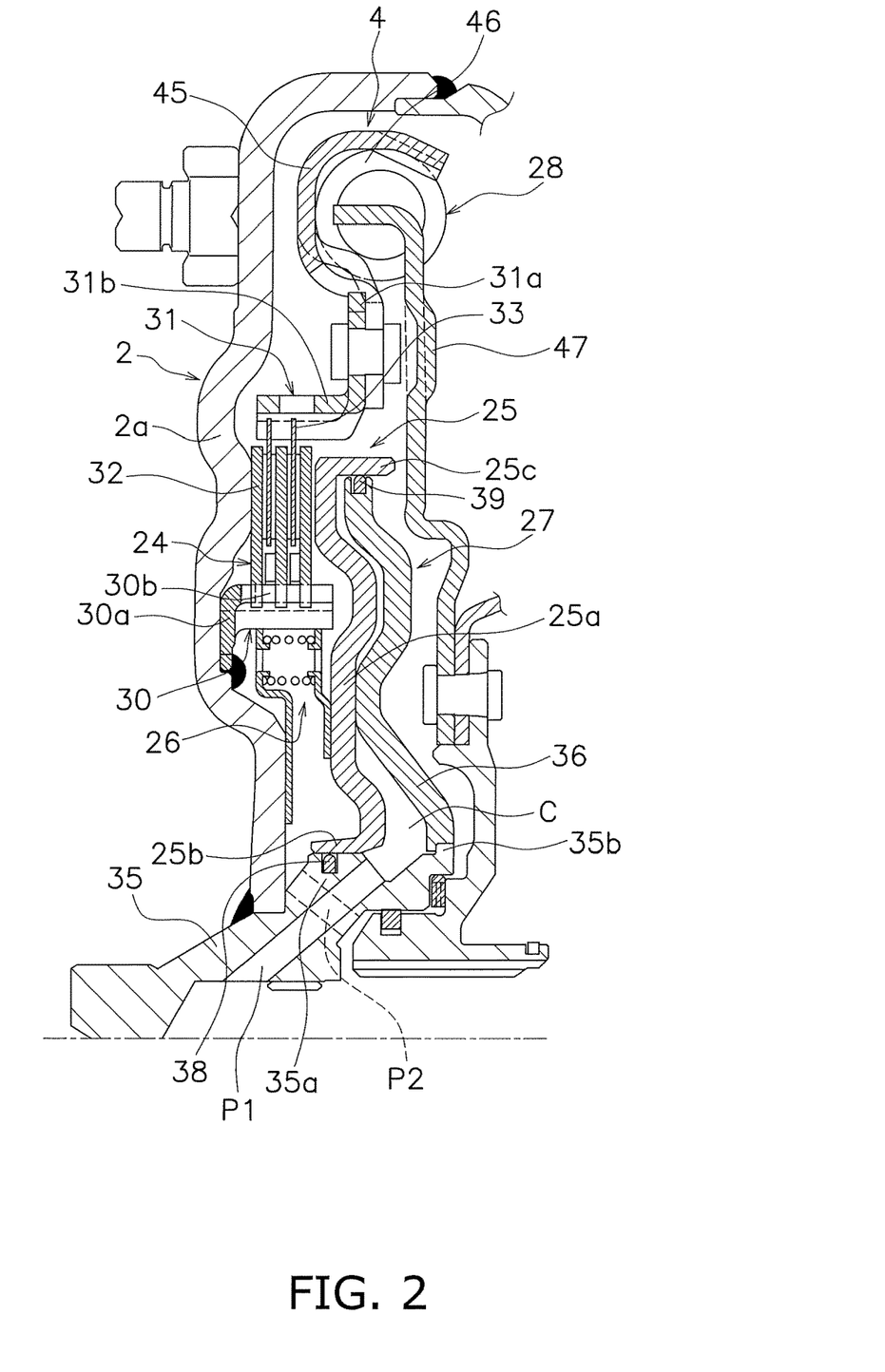
FIG. 2 is a diagram showing the lock-up device extracted from FIG. 1.

As shown in FIGS. 1 and 2, the lock-up device 4 is disposed in a space between the front cover 2 and the turbine 11. The lock-up device 4 includes a clutch part 24, a clutch actuating part 27 composed of a piston 25 and a return mechanism 26, and a damper part 28.

<Clutch Part 24>

As shown in FIGS. 1 and 2, the clutch part 24 is a multi-plate clutch. The clutch part 24 includes an inner peripheral drum 30 (exemplary first member), an outer peripheral drum 31 (exemplary second member), a plurality of first clutch plates 32 and a plurality of second clutch plates 33.

The inner peripheral drum 30 includes a fixed portion 30a and an inner peripheral tubular portion 30b (exemplary first tubular portion). The fixed portion 30a has an annular disc shape, and is fixed to the lateral surface of the front cover 2 by welding. The inner peripheral tubular portion 30b is processed by bending the outer peripheral part of the fixed portion 30a toward the turbine 11. The inner peripheral tubular portion 30b is provided with a plurality of grooves aligned at predetermined intervals in the circumferential direction.

The outer peripheral drum 31 includes a coupling portion 31a and an outer peripheral tubular portion 31b (exemplary second tubular portion). The coupling portion 31a has an annular disc shape. The outer peripheral tubular portion 31b is processed by bending the inner peripheral part of the coupling portion 31a toward the front cover 2. The outer peripheral tubular portion 31b is disposed in radial opposition to the inner peripheral tubular portion 30b of the inner peripheral drum 30. The outer peripheral tubular portion 31b is provided with a plurality of grooves aligned at predetermined intervals in the circumferential direction.

The plural first and second clutch plates 32 and 33, each having a disc shape, are alternately disposed in the axial direction. Each first clutch plate 32 is provided with a plurality of teeth on the inner peripheral part thereof. The teeth are slidably engaged with the grooves provided on the inner peripheral tubular portion 30b of the inner peripheral drum 30. Therefore, the first clutch plates 32 are axially movable but non-rotatable relative to the inner peripheral drum 30. On the other hand, each second clutch plate 33 is provided with friction members fixed to the both surfaces thereof. Each second clutch plate 33 is provided with a plurality of teeth on the outer peripheral part thereof. The teeth are slidably engaged with the grooves provided on the outer peripheral tubular portion 31b of the outer peripheral drum 31. Therefore, the second clutch plates 33 are axially movable but non-rotatable relative to the outer peripheral drum 31.

<Clutch Actuating Part 27>

The clutch actuating part 27 is a mechanism for turning the clutch part 24 to an on state (a lock-up on state, i.e., a power transmission activated state) or an off state (a lock-up off state, i.e., a power transmission deactivated state), and includes the piston 25, a sleeve 35 (exemplary boss), a hydraulic chamber plate 36 and the return mechanism 26.

—Piston 25—

The piston 25 has an annular shape and is disposed on the transmission side of the front cover 2. The piston 25 is supported by the sleeve 35, while being movable in the axial direction. The piston 25 includes a disc portion 25a, an inner peripheral tubular portion 25b and an outer peripheral tubular portion 25c. The outer peripheral part of the disc portion 25a bulges toward the front cover 2, and is capable of pressing one adjacent thereto among the first clutch plates 32 of the clutch part 24. The inner peripheral tubular portion 25b is shaped to protrude toward the front cover 2 from the inner peripheral end of the disc portion 25a. The outer peripheral tubular portion 25c is shaped to protrude toward the turbine 11 from the outer peripheral end of the disc portion 25a.

—Sleeve 35—

The sleeve 35 is fixed to the front cover 2 by welding, while being inserted at an engine-side part thereof into an inner peripheral opening of the front cover 2. Additionally, the sleeve 35 includes a support portion 35a and a fixed portion 35b in a turbine 11-side part thereof. The piston 25 is supported by the support portion 35a, while being slidable in the axial direction. On the other hand, the inner peripheral end of the hydraulic chamber plate 36 is fixed to the fixed portion 35b.

—Hydraulic Chamber Plate 36—

The hydraulic chamber plate 36, having a disc shape, is disposed on the turbine 11 side of the piston 25, and forms a hydraulic chamber C together with the piston 25 therebetween. The support portion 35a is provided with a seal member 38 on the outer peripheral surface thereof, whereby the support portion 35a and the inner peripheral tubular portion 25b of the piston 25 are sealed therebetween. On the other hand, the hydraulic chamber plate 36 is provided with a seal member 39 on the outer peripheral surface thereof, whereby the hydraulic chamber plate 36 and the outer peripheral tubular portion 25c of the piston 25 are sealed therebetween. With these configurations, the hydraulic chamber C is sealed.

The piston 25 is herein provided with a plurality of recesses 25d on the disc portion 25a. The recesses 25d are recessed toward the front cover 2. On the other hand, the hydraulic chamber plate 36 is provided with a plurality of protrusions 36a. The protrusions 36a are inserted into and engaged with the recesses 25d of the piston 25. Therefore, the piston 25 and the hydraulic chamber plate 36 (and besides, the front cover 2) are non-rotatable relative to each other, but are unitarily rotated with each other.

—Oil Pathways—

The sleeve 35 has a tubular shape and is provided with a first oil pathway P1 and a second oil pathway P2. The first oil pathway P1 connects the inner periphery of the sleeve 35 and the hydraulic chamber C therethrough. The second oil pathway P2 connects the inner periphery of the sleeve 35 and a space between the front cover 2 and the piston 25.

—Return Mechanism 26—

Figure 3:
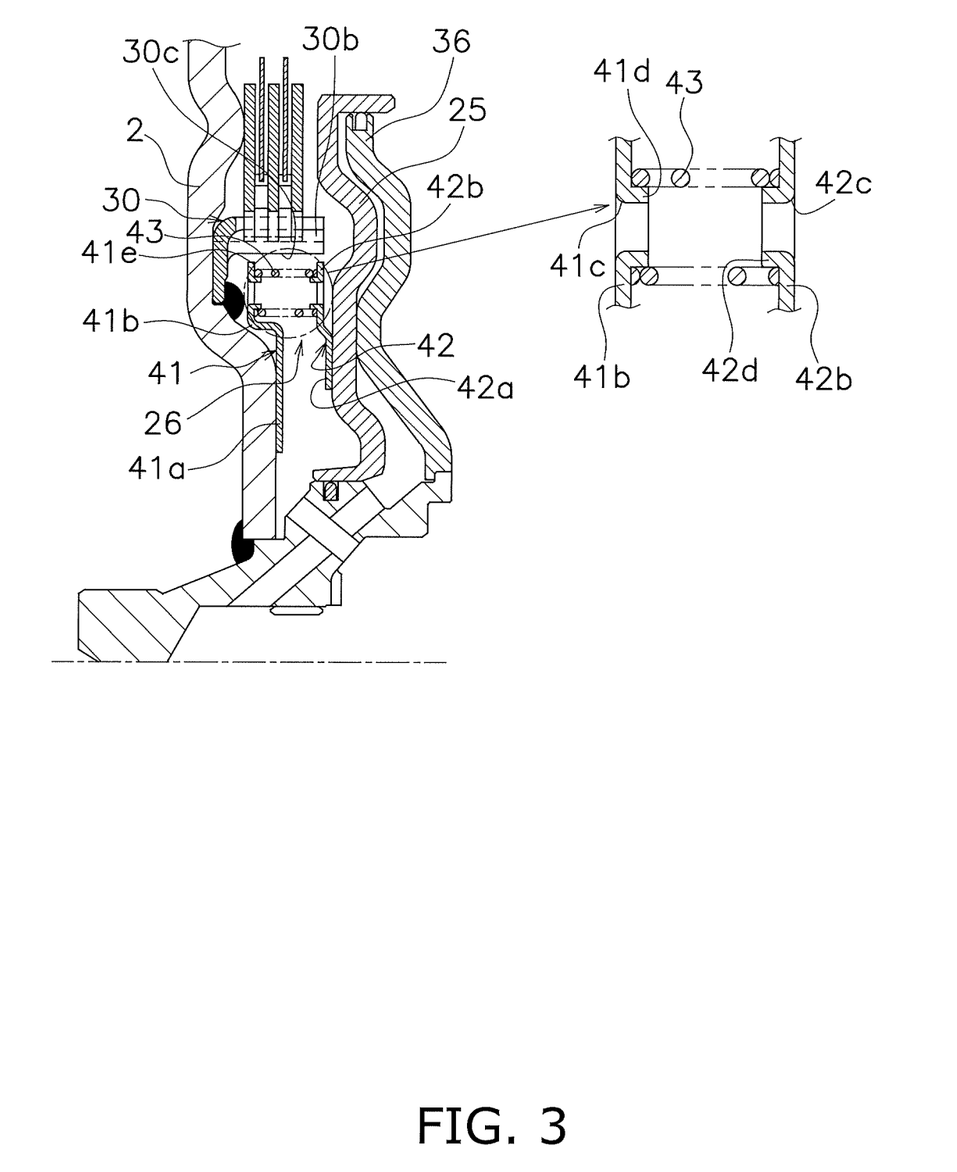
FIG. 3 is a diagram showing a return mechanism extracted from FIG. 1.

The return mechanism 26 is disposed axially between the front cover 2 and the piston 25, while being disposed radially inside the clutch part 24. The return mechanism 26 is a mechanism urging the piston 25 in a direction separating from the front cover 2. The return mechanism 26 includes a first plate 41, a second plate 42 and a plurality of coil springs 43.

The first plate 41 has a disc shape, and includes a first contact portion 41a and a first support portion 41b. The first contact portion 41a makes contact with the front cover 2. The first support portion 41b supports one end of each coil spring 43. The first contact portion 41a makes contact with the front cover 2 but is not fixed thereto. The first support portion 41b is offset (displaced) from the first contact portion 41a toward the front cover 2, and includes a plurality of holes 41c disposed in circumferential alignment. Additionally, the edge of each hole 41c is processed by extrusion so as to protrude toward the piston 25. In other words, the first support portion 41b includes a plurality of first edges 41d, each of which has an annular shape and protrudes toward the piston 25.

The second plate 42 has a disc shape, and is disposed in axial opposition to the first plate 41. The second plate 42 includes a second contact portion 42a and a second support portion 42b. The second contact portion 42a makes contact with the piston 25. The second support portion 42b supports the other end of each coil spring 43. The second contact portion 42a makes contact with the piston 25 but is not fixed thereto. The second support portion 42b is offset (displaced) from the second contact portion 42a toward the front cover 2, and includes a plurality of holes 42c disposed in circumferential alignment. The plural holes 42c are provided in positions opposed to those of the holes 41c of the first plate 41. Additionally, the edge of each hole 42c is processed by extrusion so as to protrude toward the front cover 2. In other words, the second support portion 42b includes a plurality of second edges 42d, each of which has an annular shape and protrudes toward the front cover 2.

The coil springs 43 are disposed between the first plate 41 and the second plate 42, while each is set in a compressed state. In more detail, the coil springs 43 are supported by the first and second plates 41 and 42, while each first edge 41d of the first plate 41 is press-fitted to the inner periphery of the front cover-2 side end of each coil spring 43 whereas each second edge 42d of the second plate 42 is press-fitted to the inner periphery of the piston 25-side end of each coil spring 43.

With the configuration described above, the first plate 41, the second plate 42 and the plural coil springs 43 can be integrated. In other words, the return mechanism 26 can be obtained as a sub-unit. Accordingly, when only the return mechanism 26 is transported, transportability thereof is enhanced. Besides, workability in assembling the return mechanism 26 is enhanced as well.

Incidentally, in an assembled condition of the return mechanism 26, an outer peripheral surface 41e of the first plate 41 is disposed in adjacent to an inner peripheral surface 30c of the inner peripheral drum 30 of the clutch part 24. Because of this, even when the return mechanism 26 is displaced in the radial direction, the outer peripheral surface 41e of the first plate 41 and the inner peripheral surface 30c of the inner peripheral drum 30 make contact with each other. Accordingly, radial displacement of the return mechanism 26 is modified. In other words, the return mechanism 26 is radially positioned by the outer peripheral surface 41e of the first plate 41 and the inner peripheral surface 30c of the inner peripheral drum 30.

<Damper Part 28>

As shown in FIGS. 1 and 2, the damper part 28 includes a drive plate 45, a plurality of torsion springs 46 and a driven plate 47. The drive plate 45 is fixed to the coupling portion 31a of the outer peripheral drum 31. The drive plate 45 axially and radially supports the plural torsion springs 46, and are engaged with the plural torsion springs 46 in a rotational direction. Additionally, the driven plate 47 is engaged at the outer peripheral part thereof with the end surfaces of the plural torsion springs 46, while being fixed at the inner peripheral part thereof to the turbine hub 17.

[Action]

First, an action of the torque converter body 3 will be explained. During rotation of the front cover 2 and the impeller 10, the hydraulic oil flows from the impeller 10 to the turbine 11, and further flows to the impeller 10 through the stator 12. Accordingly, a torque is transmitted from the impeller 10 to the turbine 11 through the hydraulic oil. The torque transmitted to the turbine 11 is transmitted to the input shaft of the transmission through the turbine hub 17.

When the speed ratio of the torque converter 1 increases and rotation of the input shaft reaches a predetermined speed, the hydraulic oil is supplied to the hydraulic chamber C through the first oil pathway P1. Additionally, the hydraulic oil is discharged from the space produced between the front cover 2 and the piston 25 through the second oil pathway P2. Accordingly, the piston 25 is moved toward the front cover 2 against the urging force applied thereto from the return mechanism 26. As a result, a pressing portion of the piston 25 presses the first and second clutch plates 32 and 33 onto the lateral surface of the front cover 2, whereby a lock-up state (clutch-on state) is made.

In the clutch-on state described above, a torque is transmitted from the front cover 2 to the torque converter body 3 through the lock-up device 4. In other words, the torque inputted to the front cover 2 is outputted to the turbine hub 17 through the clutch part 24 and the damper part 28 in the lock-up device 4. In the clutch-on state, torque fluctuations are attenuated by the damper part 28 of the lock-up device 4.

When the lock-up state is turned off (i.e., a clutch-off state is made), the hydraulic chamber C is connected to a drain. Accordingly, the hydraulic oil is discharged from the hydraulic chamber C through the first oil pathway P1. Additionally, the piston 25 is moved toward the turbine 11 by the urging force applied thereto from the coil springs 43 of the return mechanism 26, whereby pressure applied to the first and second clutch plates 32 and 33 from the piston 25 is released. Accordingly, the clutch-off state is made.

[Prevention of Reverse Assemblage]

In the present preferred embodiment, each of the first and plates 41 and 42 is shaped such that the support portion 41b, 42b is offset (displaced) from the contact portion 41a, 42a toward the front cover 2. Because of this, reverse assemblage can be prevented.

Figure 4A:
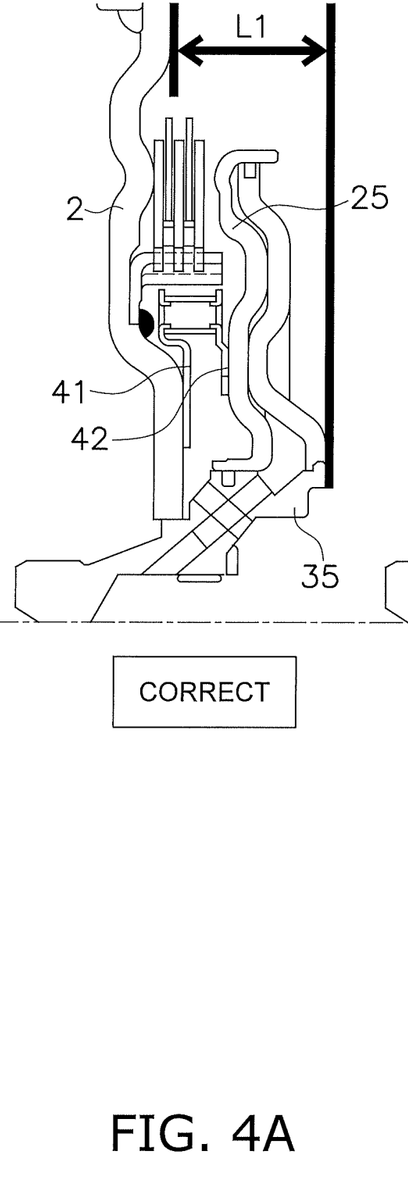
FIGS. 4A and 4B are diagrams for explaining prevention of reverse assemblage of the return mechanism.
Figure 4B:
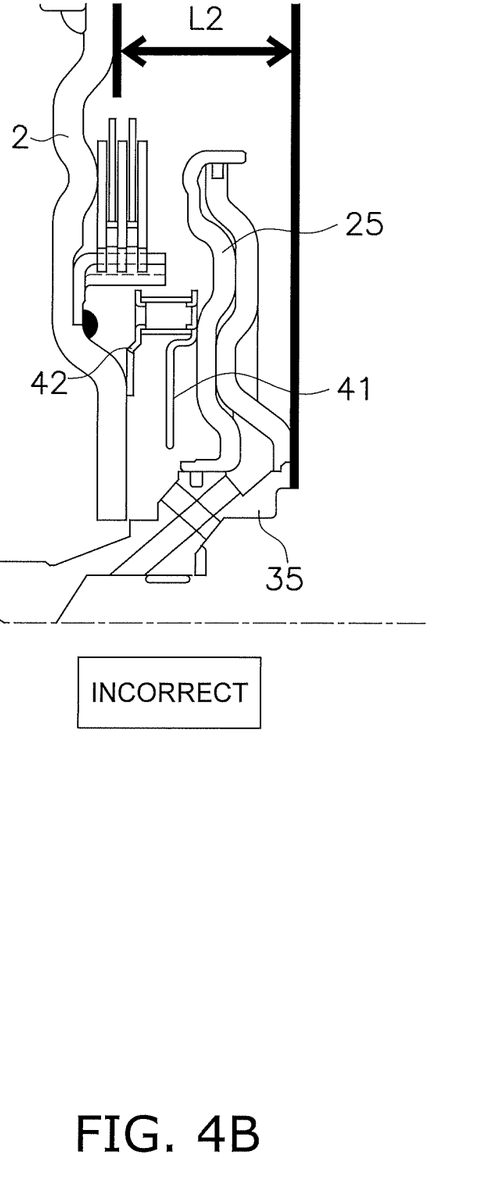

FIG. 4A shows a correctly assembled state of the return mechanism 26. By contrast, FIG. 4B shows a reversely assembled state of the return mechanism 26. As is obvious from these diagrams, when the return mechanism 26 is assembled in a correct orientation, distance L1 is set as the distance between the front cover 2 and the distal end of the sleeve 35. By contrast, when the return mechanism 26 is reversely assembled in an incorrect orientation, distance L2 is set as the distance between the front cover 2 and the distal end of the sleeve 35, and is longer than distance L1 set when the return mechanism 26 is assembled in the correct orientation. Because of this, reverse assemblage can be detected during the process of assemblage.

Other Preferred Embodiments

The present invention is not limited to the preferred embodiment described above, and a variety of changes or modifications can be made without departing from the scope of the present invention.

Figure 5:
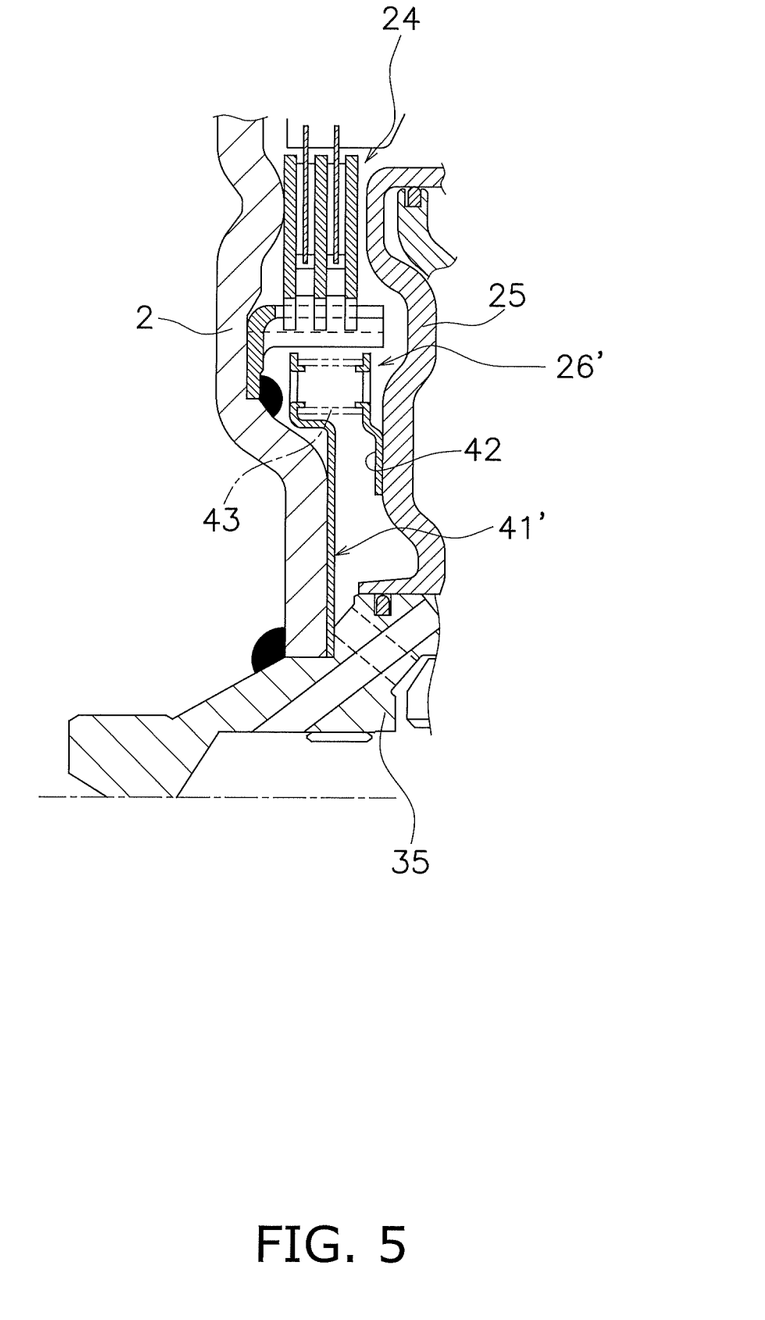
FIG. 5 is a diagram corresponding to FIG. 3 in another preferred embodiment of the present invention.

(a) FIG. 5 shows a return mechanism according to another preferred embodiment. In this preferred embodiment, a first plate 41' extends to the inner peripheral side, and the inner peripheral end thereof is interposed between the front cover 2 and the sleeve 35. Additionally, the inner peripheral end surface of the first plate 41' makes contact with the outer peripheral surface of the sleeve 35. On the other hand, configurations other than the above are similar to those in the aforementioned preferred embodiment. Even in the preferred embodiment herein described, a return mechanism 26' can be radially and axially positioned.

(b) In the aforementioned preferred embodiment, the return mechanism 26 is radially positioned by the outer peripheral surface 41e of the first plate 41 and the inner peripheral surface 30c of the inner peripheral drum 30. Alternatively, the return mechanism 26 may be radially positioned by the outer peripheral surface of the second plate 42 and the inner peripheral surface 30c of the inner peripheral drum 30.

(c) The configuration of the clutch part 24 and that of the damper part 28 are not limited to those in the aforementioned preferred embodiment. For example, the present invention is similarly applicable even to a lock-up device in which the clutch part is a single-plate clutch. Additionally or alternatively, the present invention is similarly applicable even to a lock-up device that is not provided with any damper part.

REFERENCE SIGNS LIST

1 Torque converter
2 Front cover
4 Lock-up device
24 Clutch part
25 Piston
26 Return mechanism
28 Damper part
30 Inner peripheral drum (first member)
30b Inner peripheral tubular portion (first tubular portion)
30c Inner peripheral surface
31 Outer peripheral drum (second member)
31b Outer peripheral tubular portion (second tubular portion)
32 First clutch plate
33 Second clutch plate
35 Sleeve (boss)
41 First plate 41d First edge
41e Outer peripheral surface
42 Second plate
42d Second edge
43 Coil spring

What is claimed is:

1. A lock-up device for a torque converter transmitting a torque from a front cover to a transmission-side member through a turbine, the lock-up device comprising:
   a clutch part configured to transmit the torque from the front cover toward the turbine;
   a piston axially opposed to the front cover through the clutch part, the piston axially movable, the piston configured to apply a pressing force to the clutch part whereby the clutch part is turned to a power transmission activated state; and
   a return mechanism configured to urge the piston in a direction away from the front cover, the return mechanism disposed axially between the front cover and the piston while disposed radially inside the clutch part, the return mechanism including a first plate, a second plate and an elastic member, the first plate making contact with the front cover, the second plate making contact with the piston while axially opposed to the first plate, the elastic member disposed between the first plate and the second plate while set in a compressed state,
   each of the first and second plates having a disc shape, and both of the first and second plates making contact at an outer peripheral surface thereof with the clutch part whereby the return mechanism is radially positioned.

2. The lock-up device according to claim 1, wherein the first plate makes contact with a lateral surface of the front cover without fixed thereto, and
   the second plate makes contact with a lateral surface of the piston without fixed thereto.

3. The lock-up device according to claim 1, wherein the clutch part includes
   a first member fixed to the front cover, the first member including a first tubular portion, the first tubular portion protruding toward the piston,
   a second member configured to transmit the torque toward the turbine, the second member including a second tubular portion, the second tubular portion radially opposed to the first tubular portion,
   a first clutch plate engaged with the first tubular portion, and
   a second clutch plate engaged with the second tubular portion, and
   either of the first and second plates is configured to make contact at the outer peripheral surface thereof with an inner peripheral surface of the first tubular portion.

4. The lock-up device according to claim 1, wherein the elastic member is one of a plurality of coil springs, the coil springs disposed in circumferential alignment between an outer peripheral part of the first plate and an outer peripheral part of the second plate.

5. The lock-up device according to claim 4, wherein the first plate includes a first edge, the first edge annularly protruding toward the second plate,
   the second plate includes a second edge, the second edge annularly protruding toward the first plate, the second edge opposed to the first edge, and
   the first edge is press-fitted to an inner periphery of one end of the coil spring while the second edge is press-fitted to an inner periphery of the other end of the coil spring whereby the coil spring is supported by the first and second plates.

6. The lock-up device according to claim 1, further comprising:
   a damper part disposed between the clutch part and the turbine, the damper part including an elastic member configured to attenuate torque fluctuations.

7. A lock-up device for a torque converter transmitting a torque from a front cover to a transmission-side member through a turbine, the lock-up device comprising:
   a clutch part configured to transmit the torque from the front cover toward the turbine;
   a piston axially opposed to the front cover through the clutch part, the piston axially movable, the piston configured to apply a pressing force to the clutch part whereby the clutch part is turned to a power transmission activated state;
   a return mechanism configured to urge the piston in a direction away from the front cover, the return mechanism disposed axially between the front cover and the piston while disposed radially inside the clutch part, the return mechanism including a first plate, a second plate and an elastic member, the first plate making contact with the front cover, the second plate making contact with the piston while axially opposed to the first plate, the elastic member disposed between the first plate and the second plate while set in a compressed state; and
   a boss fixed to an inner peripheral part of the front cover, the boss protruding axially toward the turbine, wherein
   each of the first and second plates has a disc shape including a hole in a center part thereof,
   the first plate makes contact at an inner peripheral surface thereof with an outer peripheral surface of the boss whereby the return mechanism is radially positioned, and
   the first plate is interposed at an inner peripheral end thereof between a lateral surface of the front cover and a lateral surface of the boss whereby the return mechanism is axially positioned.

8. A lock-up device for a torque converter transmitting a torque from a front cover to a transmission-side member through a turbine, the lock-up device comprising:
   a clutch part configured to transmit the torque from the front cover toward the turbine;
   a piston axially opposed to the front cover through the clutch part, the piston axially movable, the piston configured to apply a pressing force to the clutch part whereby the clutch part is turned to a power transmission activated state; and
   a return mechanism configured to urge the piston in a direction away from the front cover, the return mechanism disposed axially between the front cover and the piston while disposed radially inside the clutch part, the return mechanism including a first plate, a second plate and an elastic member, the first plate making contact with the front cover, the second plate making contact with the piston while axially opposed to the first plate, the elastic member disposed between the first plate and the second plate while set in a compressed state,
   each of the first and second plates having a disc shape, and
   at least one of the first plate or the second plate being configured such that an outer peripheral surface thereof comes into a contact state with the clutch part from a non-contact state with the clutch part whereby the return mechanism is radially positioned.

* * * * *